No. 872,005. PATENTED NOV. 26, 1907.
P. A. McCULLOUGH.
AUTOMATICALLY OPENING VALVE.
APPLICATION FILED APR. 15, 1907.
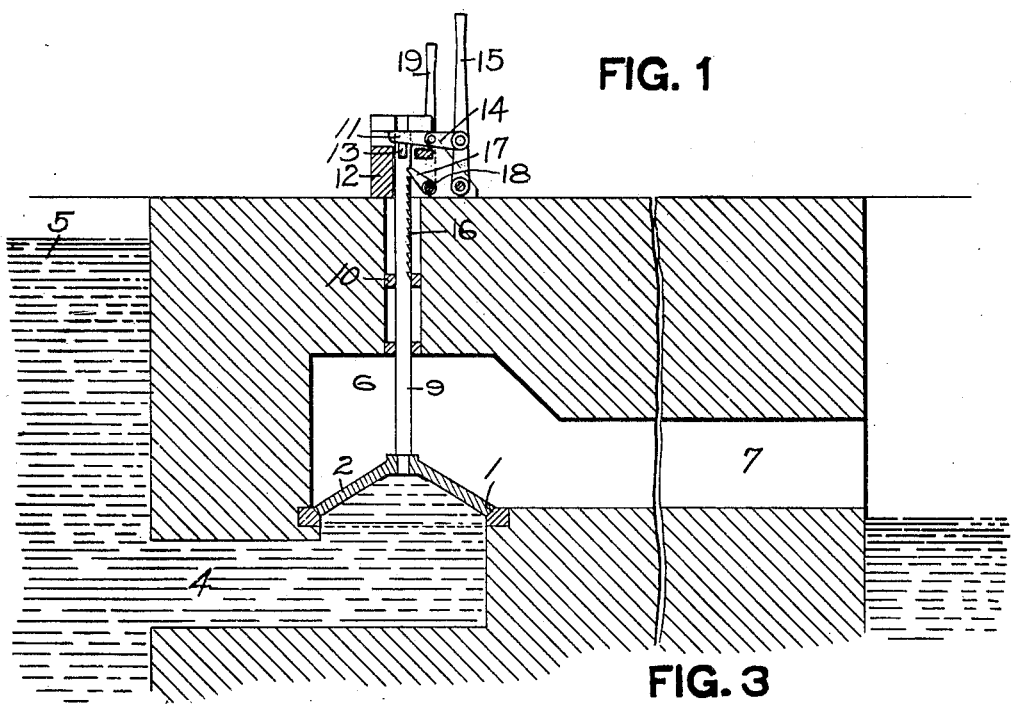
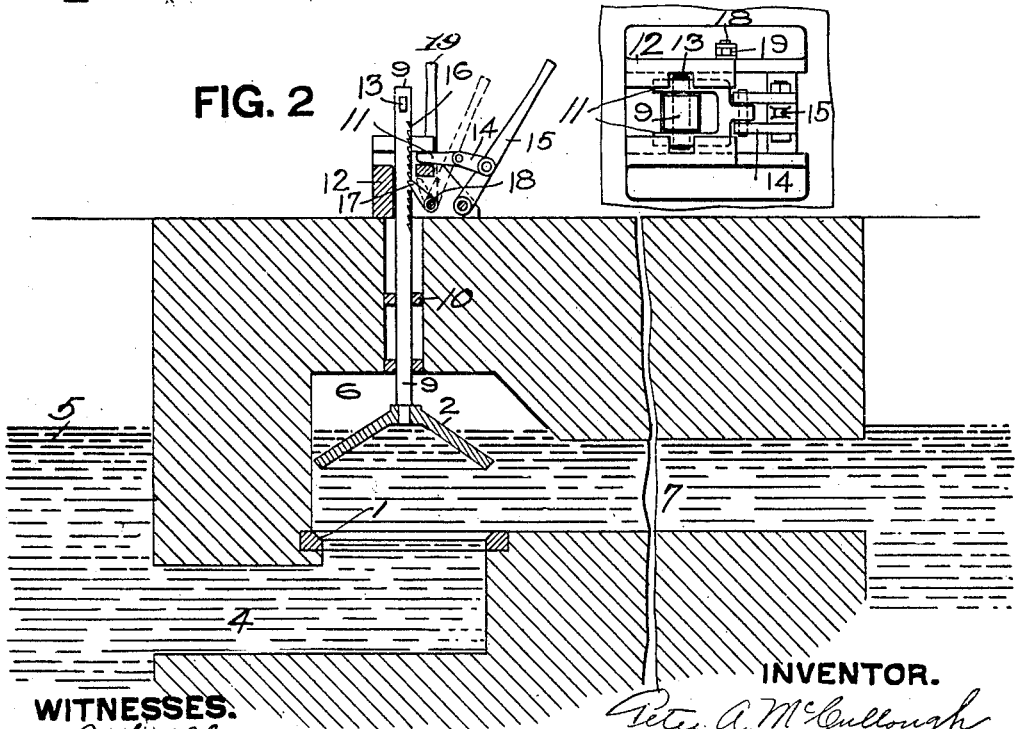

UNITED STATES PATENT OFFICE.

PETER A. McCULLOUGH, OF PITTSBURG, PENNSYLVANIA.

AUTOMATICALLY-OPENING VALVE.

No. 872,005.   Specification of Letters Patent.   Patented Nov. 26, 1907.

Application filed April 15, 1907. Serial No. 368,372.

*To all whom it may concern:*

Be it known that I, PETER A. McCUL-LOUGH, a resident of Pittsburg, in the county of Allegheny and State of Pennsylvania, have invented a new and useful Improvement in Automatically-Opening Valves; and I do hereby declare the following to be a full, clear, and exact description thereof.

This invention relates to valve mechanism, and more especially to valve mechanism for admitting fluid under a head or pressure from one side of the valve to the other and permitting the same to equalize, such as valves used on locks and other places for admitting water from a higher to a lower level until the two levels equalize.

The object of the invention is to provide a valve mechanism for this purpose which is simple and cheap of construction and especially valve mechanism which is practically automatic in its action, thereby saving a large amount of time and expense in operating as compared with prior forms of valve mechanism.

The invention comprises the construction and arrangement of parts hereinafter described and claimed.

In the accompanying drawing Figure 1 is a vertical sectional view through valve mechanism embodying the invention showing the valve closed; Fig. 2 is a similar view showing the valve open; and Fig. 3 is a plan view of a portion of the valve.

In the drawings 1 indicates a valve seat and 2 a disk valve coöperating with the seat, and adapted to close the passage through said seat. Communicating with the side of the seat opposite that on which the valve rests is a passage 4 which communicates with the fluid under pressure, such as a body of water 5 at the higher level. The valve 2 works in a chamber 6 which has communicating therewith a passage 7 leading to the body of water at lower level, such as a lock chamber. When the valve 2 is on its seat the communication between the body of water at higher level and the one at lower level is cut off, while, when the valve is open, fluid may pass through the valve and equalize the two levels.

The valve is provided with a stem 9 extending up through suitable guides 10 and having a sliding fit therein, so that normally the valve 2 is free to rise under fluid pressure in the passage 4 acting on the under face of the valve. The design is to allow said valve to be raised from its seat by the pressure of the fluid at the higher level, thus rendering the opening of the valve automatic, due to the difference of pressure on the two faces thereof. Also when the fluid pressure on the two sides of the valve equalizes, or substantially so, the valve will drop by gravity to its seat.

In order to lock or hold the valve in its closed position, that is, against the seat, I provide suitable means, preferably some movable abutment or other member which can be moved across the path of movement of the valve or its stem when the valve is seated so as to prevent the valve from again rising, such abutment preferably being arranged to force the valve tightly against its seat. Various means for this purpose can be readily adapted, such as a cam, toggle links, or the like. In the drawings this means is shown as a wedge shaped member 11 preferably double or forked, and guided in ways in a suitable frame 12 which holds the wedge shaped member against vertical movement, said member being arranged to engage lugs 13 or other suitable shoulders on the valve stem 9. When said wedge shaped member is drawn outwardly so as to no longer to be in the path of the lug 13 on the valve stem the latter with the valve is free to rise, but when said member is pushed inwardly so as to lie in the path of the lugs 13 the valve is held against rising. The incline of the wedge shaped member serves, when said member is forced inwardly, to force the valve tightly against its seat. This wedge shaped member may be operated by any suitable means, such as by being connected by a link 14 to a lever 15. I also preferably provide suitable means for holding the valve in its elevated position when it is opened by fluid pressure so as to keep the valve from dropping gradually as the fluid pressure on the two sides thereof becomes partly equalized in order to keep the opening through the valve at its maximum and permit the pressures to equalize rapidly. Various means for this purpose may be employed but preferably the means will be so arranged as to automatically engage the valve or valve stem when it rises and in a manner to prevent it again dropping until said means is released. As one means for accomplishing this purpose I have shown the valve stem 9 provided with rack or ratchet teeth 16 arranged to be engaged by a pawl or dog 17, the latter being shown as pivoted on a short shaft 18 which has connected thereto an operating lever 19. The pawl is always in contact with the rack teeth, but it is so positioned as not to interfere with the free upward movement of the valve stem, but any downward movement of the valve stem is arrested by the pawl as will be readily understood.

The operation of the valve is as follows: We will assume that the valve is closed and that there is a head of water in the passage 4 acting against the lower face of the valve and that the passage 7 leads for instance to an empty lock. In this position the wedge member 11 is in its innermost position, as shown in Fig. 1, lying above the lugs 13 on the valve stem and serving to prevent the valve 2 from rising from its seat under the pressure in passage 4. When it is desired to open the valve, the operator merely draws back the wedge member 11, thus relieving the valve and permitting the same to rise under the pressure on its lower face. The valve therefore rises automatically, being forced upwardly without any manual operation other than the removal of the wedge or abutment 11. The dog or pawl 17 clicks over the rack teeth 16 in the upward movement of the valve and said dog holds the valve against again dropping so the valve is held fully open until the pressure on the two sides equalizes, that is, until the water in the lock is of the same level as the head above the lock. The attendant then operates the lever 19 to disengage the pawl 17 from the rack teeth 16 and the valve drops by gravity until it rests on its seat, or practically so. The attendant then operates the lever 15, pushing the wedge member 11 inwardly so as to form an abutment in the path of the lugs 13 on the valve stem, and in doing so the inclined face of the wedge forces the valve tightly against its seat in order to prevent leakage.

The amount of labor necessary to operate the valve is very small, it being merely necessary for the attendant to operate the levers 15 and 19, this being a very simple operation, not laborious, and requiring only a few seconds of time. There is, therefore, a large saving in the time of operation of my valve as compared with prior lock valves, which are usually operated by means of a screw, or gear working on a rack. These valves are very large, usually about eight feet in diameter and as they must be raised substantially a similar distance, the work of opening and closing the same by rotating a screw or gear is not only laborious but consumes a great deal of time. Many locks have as high as thirty-two valves for inlet and outlet, so that it requires a considerable force of men to operate them. Power mechanism is sometimes used but this is quite costly. The number of lock attendants necessary with my valve is very much less than that with other forms of valves and the cost of the valve is also small compared with that of prior forms of valves.

What I claim is:

1. In valve mechanism, the combination of a valve seat, a valve arranged to seat thereon against fluid pressure and to be opened automatically by said pressure, and valve locking means arranged to engage with and to be disengaged from said valve to thereby hold said valve to its seat and to permit the same to open.

2. In valve mechanism, the combination of a valve seat, a valve arranged to seat thereon against fluid pressure and to be opened automatically by said pressure, and a movable abutment arranged to be moved into position to engage the valve and force the same against its seat, or to be disengaged from the valve to permit the latter to open.

3. In valve mechanism, the combination of a valve seat, a valve coöperating with the seat and arranged to open under fluid pressure and to close automatically when the pressure on its opposite sides equalizes, and an abutment arranged to be moved into the path of movement of the valve and hold the same against its seat and to be moved out of said path to permit the valve to open.

4. In valve mechanism, the combination of a valve seat, a valve coöperating with the seat and arranged to be opened by the fluid pressure and automatically seat when the fluid pressure on its opposite sides equalizes, and a movable member having an inclined face and arranged to engage the valve to force the same against its seat or to disengage the valve to permit the same to open.

5. In valve mechanism, the combination of a valve seat, a valve arranged to seat thereon against fluid pressure, a movable member arranged to engage the valve and hold the same against its seat or disengage the same and permit it to be opened, and means arranged to engage the valve when open and to hold the same open.

6. In valve mechanism, the combination of a valve seat, a valve arranged to seat thereon against fluid pressure, a movable member arranged to engage the valve and hold the same against its seat or to disengage the valve and permit the same to open, and means arranged to automatically engage the valve and hold it open and movable out of engagement with the valve to release the same.

7. In valve mechanism, the combination of a valve seat, a valve arranged to seat thereon against fluid pressure, a movable member arranged to engage the valve and hold it against its seat or to be disengaged therefrom to permit it to open, and a rack and dog arranged to automatically hold the valve in its open position.

8. In valve mechanism for locks, the combination of a movable valve subject to pressure on one face and arranged to be opened by said pressure, and an abutment arranged to be moved into the path of movement of the valve and hold the same against its seat, and to be moved out of said path to permit the valve to open.

In testimony whereof, I the said PETER A. McCULLOUGH have hereunto set my hand.

PETER A. McCULLOUGH.

Witnesses:
F. W. WINTER,
ROBERT C. TOTTEN.